United States Patent
Lopez-Barron et al.

(10) Patent No.: US 10,472,437 B2
(45) Date of Patent: Nov. 12, 2019

(54) POLY(VINYLBIPHENYL) AND POLY(VINYLCYCLOHEXYLSTYRENE) POLYMERS AND ARTICLES THEREFROM

(71) Applicant: ExxonMobil Chemical Patents Inc., Baytown, TX (US)

(72) Inventors: Carlos R. Lopez-Barron, Houston, TX (US); Mark K. Davis, Humble, TX (US); Alan A. Galuska, Huffman, TX (US); Yong Yang, Kingwood, TX (US); Mosha H. Zhao, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/808,096

(22) Filed: Nov. 9, 2017

(65) Prior Publication Data

US 2018/0155471 A1   Jun. 7, 2018

Related U.S. Application Data

(60) Provisional application No. 62/465,473, filed on Mar. 1, 2017, provisional application No. 62/430,128, filed on Dec. 5, 2016.

(30) Foreign Application Priority Data

Jan. 17, 2017   (EP) .................................. 17151697

(51) Int. Cl.
*C08F 112/32* (2006.01)
*C08L 25/04* (2006.01)

(52) U.S. Cl.
CPC ............. *C08F 112/32* (2013.01); *C08L 25/04* (2013.01); *C08F 2438/00* (2013.01)

(58) Field of Classification Search
CPC .......... C08F 12/32; C08F 4/04; C08F 112/52; C08F 2438/00; C08L 25/02; C08L 9/00; C08L 71/12; C08L 25/04
See application file for complete search history.

(56) References Cited

U.S. PATENT DOCUMENTS

| | | |
|---|---|---|
| 2,572,572 A | 10/1951 | Mowry et al. |
| 2,749,321 A | 6/1956 | Ham |
| 2,761,855 A | 9/1956 | Ham |
| 2,769,793 A | 11/1956 | Ham |
| 2,862,905 A | 12/1958 | Banes et al. |
| 3,097,186 A | 7/1963 | Kent et al. |
| 3,151,184 A | 9/1964 | Stafford et al. |
| 3,862,263 A | 1/1975 | Maruta et al. |
| 4,338,410 A | 7/1982 | Ueno et al. |
| 4,550,214 A | 10/1985 | Mehta |
| 4,997,898 A | 3/1991 | Ishihara et al. |
| 5,227,426 A | 7/1993 | Tse et al. |
| 5,283,286 A | 2/1994 | Takahashi et al. |
| 5,340,892 A | 8/1994 | Kuramoto |
| 5,403,908 A * | 4/1995 | Watanabe et al. ...... C08F 12/04 526/160 |
| 5,721,320 A | 2/1998 | Priddy et al. |
| 5,959,033 A | 9/1999 | Demirors et al. |
| 6,025,447 A | 2/2000 | Wunsch et al. |
| 6,080,819 A | 6/2000 | Raetzsch et al. |
| 6,350,813 B1 | 2/2002 | Schrader et al. |
| 6,444,752 B1 | 9/2002 | Demirors et al. |
| 6,545,090 B1 | 4/2003 | Demirors et al. |
| 6,706,814 B2 | 3/2004 | Demirors |
| 9,453,125 B2 | 9/2016 | Veraart et al. |
| 2002/0035176 A1 | 3/2002 | King et al. |
| 2003/0138397 A1 | 7/2003 | Kurtz et al. |
| 2006/0241265 A1 | 10/2006 | Harwood et al. |
| 2008/0241565 A1 | 10/2008 | Germroth et al. |
| 2011/0224351 A1 | 9/2011 | Mori et al. |
| 2014/0073751 A1 | 3/2014 | Qin |
| 2015/0316356 A1 | 11/2015 | Saucedo |
| 2018/0305512 A1* | 10/2018 | Lopez-Barron et al. .. C08J 9/22 |

FOREIGN PATENT DOCUMENTS

| | | |
|---|---|---|
| CA | 496145 A | 9/1953 |
| EP | 0017751 | 10/1980 |
| GB | 1445605 | 8/1976 |
| JP | 2001 192423 A | 7/2001 |
| WO | 1998/032797 | 7/1998 |
| WO | 2005/121848 A | 12/2005 |
| WO | 2015/012931 | 1/2015 |

OTHER PUBLICATIONS

Kwon, J.H., et al., "Organic Thin Film Transistor with Poly(4-vinylbiphenyl) Blended 6, 13-Bis(triisopropylsilethynyl)pentacene on Propyleneglycolmonomethyletheracetate Dielectric Surface", Journal of Nanoscience and Nanotechnology, vol. 10, pp. 3198-3202, 2010.
Marvel, C.S., et al., "The Preparation and Polymerization of Some Alkyl Styrenes," Journal of the American Chemical Society, vol. 68, pp. 1088-1091, 1946.
Jang, Nam et al. (2009) "Study of Novel Halogen-Free Flame Retardant System through TGA and Structure Analysis of Polymers," Journal of Applied Polymer Science, v.112, pp. 2669-2675.
Kambour, R. P. et al. (1988) "Miscibility of poly(2,6-dimethyl-1,4-phenylene oxide) with several styrenic homopolymers: dependence of interaction parameters from critical molecular weights on cohesive energy densities," Polymer Communications, v.29(6), 2 pages.

* cited by examiner

*Primary Examiner* — Nathan M Nutter

(57) ABSTRACT

Disclosed is an article comprising polymers and copolymers selected from the group consisting of poly(vinylbiphenyl), poly(vinylcyclohexylstyrene), substituted versions thereof, and blends thereof, the polymer or copolymer having a weight average molecular weight (Mw) of at least 100 kg/mole and a glass transition temperature (Tg) of at least 100° C. The polymers are desirably processed in the melted state at a temperature of at least 150° C. to impart orientation and extensional strain hardening.

19 Claims, 6 Drawing Sheets

POLY(VINYLBIPHENYL) AND POLY(VINYLCYCLOHEXYLSTYRENE) POLYMERS AND ARTICLES THEREFROM

PRIORITY CLAIM

This application claims priority to and the benefit of U.S. Ser. No. 62/465,473, filed Mar. 1, 2017; U.S. Ser. No. 62/430,128 filed Dec. 5, 2016; all of which are incorporated by reference in their entirety.

FIELD OF THE INVENTION

The present invention relates to high glass transition temperature polymers, especially poly(vinylbiphenyl) ("PVBP") and poly(cyclohexylstyrene) ("PCHS") polymers and copolymers and useful articles made therefrom.

BACKGROUND

Though poly(vinylbiphenyl) ("PVBP") and poly(vinylcyclohexylstyrene) ("PCHS") polymers are known, there are few uses for these polymers as they tend to have poor impact strength and limited extensional strain hardening. These polymers are known however to have a high glass transition temperature, making them candidates for applications that require high temperature stability. It has been surprisingly found that these polymers can be tailored such that prior limitations in their properties can be overcome to produce a number of useful articles.

Relevant references include U.S. Pat. Nos. 2,572,572, 5,403,908, US 2008/241565, CA 496 145, JP 2001-192423, and C. S. Marvel, R. E. Allen and C. G. Overberger in "The Preparation and Polymerization of Some Alkyl Styrenes," in 68 J. AM. CHEM. SOC., 1088-1091 (1946).

SUMMARY

Disclosed are articles comprising (or consisting essentially of) polymers or copolymers selected from the group consisting of poly(vinylbiphenyl), poly(vinylcyclohexylstyrene), substituted versions thereof, and blends thereof, the polymer having a weight average molecular weight (Mw) of at least 100, or 150, or 200 kg/mole and a glass transition temperature (Tg) of at least 100, or 110, or 120, or 130° C.

DETAILED DESCRIPTION

Figure 1:
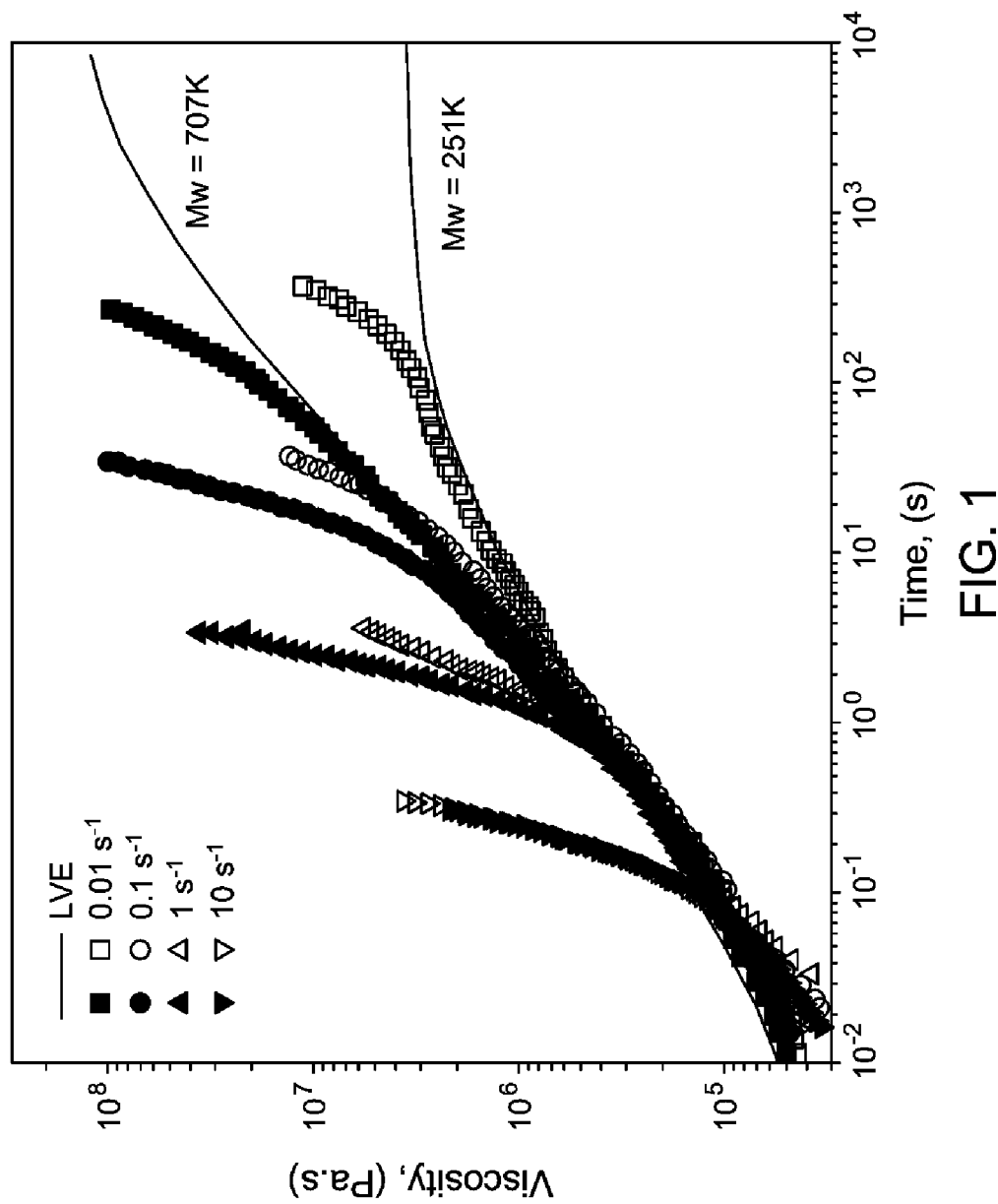
FIG. 1 shows two examples of extensional strain hardening during start-up experiments performed and the indicated Hencky strain rates for PVBP examples, where the open symbols correspond to the polymer having Mw of 251 kg/mole, and the closed symbols correspond to 707 kg/mole.

High molecular weight PVBP polymers and PCHS polymers were synthesized by free radical polymerization and anionic polymerization. The amount of initiator was adjusted to allow the polymer molecular weight to be as high as needed for the polymers to be well entangled (Mw greater than 80, or 100 kg/mole), which assures integrity of the polymers without compromising processability.

Thus, in any embodiment is an article comprising (or consisting essentially of) polymers or copolymers selected from the group consisting of poly(vinylbiphenyl), poly (cyclohexylstyrene), substituted versions thereof, and blends thereof, the polymer having a weight average molecular weight (Mw) of at least 100, or 150, or 200 kg/mole and a glass transition temperature (Tg) of at least 100, or 110, or 120, or 130° C. Preferably, both polymers are poly(4-vinylbiphenyl) and poly(4-cyclohexylstyrene) or copolymers thereof.

By "substituted versions thereof" what is meant is the PVBP and PCHS compounds having one or more hydrogen atoms substituted for another atom or moiety such as a C1 to C6, or C10 alkyl, a C6 to C20 aryl, a C7 to C22 alkylaryl, a C7 to C22 arylalkyl, a C1 to C6 or C10 alkoxy, a hydroxyl group, carboxy group, an amine group, a halogen, and combinations thereof. Most preferably, the polymers are not substituted.

In any embodiment the PVBP and PCHS polymers have a weight average molecular weight (Mw) within a range from 100, or 150, or 200 kg/mole to 300, or 400, or 500, or 600, or 700, or 800, or 1000 kg/mole. In any embodiment, the number average molecular weight of the PVBP or PCHS is greater than 80, or 100, or 140, or 160, or 200 g/mole, or within a range from 80, or 100, or 140, or 160, or 200 g/mole to 250, or 300, or 400 g/mole. In any embodiment the PVBP and PCHS polymers have an Mw/Mn value within the range from 1.5, or 2 to 2.5 or 3, or 3.5, or 4, or 4.5, or 5.

PVBP polymers and PCHS polymers can be synthesized by free radical polymerization and anionic polymerization using suitable "initiators" such as air (oxygen), n-hydroxyphthalimide (NHPI), azobisisobutylronitrile (AIBN), t-butylperoxide, cumene hydroperoxide, or combinations thereof, or other compound known in the art to initiate free radical polymerization in aprotic media. In any embodiment the level of such initiator in the reaction with monomer such as 4-vinyl-biphenyl or 4-vinyl-cyclohexylstyrene is within a range from 0.0001 to 0.001, or 0.005, or 0.01 weight initiator/weight monomer ratio. In any embodiment, as the ratio of initiator to monomer goes down, the Mw of the polymer goes up. Preferably the reactions were carried out in aprotic media, more preferably in an aromatic solvent such as benzene, xylene, toluene, or a combination thereof. In any embodiment the reactions were carried out at a temperature of at least 90, or 100, or 120° C., or within a range from 90, or 100, or 120° C. to 140, or 160, or 180° C.

The PVBP and PCHS polymers and copolymers have many desirable properties. In any embodiment the PVBP and PCHS polymers, copolymers or blends thereof have a flexural modulus of at least 2000, or 2200, or 2400, or 2700 MPa, or within a range from 2000, or 2200, or 2400, or 2700 MPa to 2800, or 3000, or 3200, or 3400 MPa.

In any embodiment the PVBP and PCHS polymers, copolymers or blends thereof have a tensile strength at break within the range from 5, or 10, or 15 MPa to 30, or 50, or 80, or 100 MPa.

In any embodiment the PVBP and PCHS polymers, copolymers or blends thereof have a Tg within a range from 100, or 110, or 120, or 130° C. to 140, or 150, or 160, or 180, or 200° C. In any embodiment the TGA degradation onset temperature is at least 340, or 380, or 400, or 420° C., or within a range from 340, or 380, or 400, or 420° C. to 460, or 480, or 500° C.

The PVBP and PCHS polymers and copolymers may also be combined with other polymers to improve their properties. In any embodiment the PVBP and PCHS polymers, or the articles made therefrom, also comprise (or consisting essentially of) poly(phenylene oxide), a diene elastomer such as polybutadiene, ethylene-propylene diene (EPDM) rubber, ethylene-propylene rubber, a propylene-based elastomer such as Vistamaxx™ propylene elastomers, ethylene-based elastomers and plastomers, butyl rubber, and combinations thereof. In any embodiment, this blend can be effected by combining the monomers such as butadiene, divinyl benzene and/or isoprene monomers with the 4-VBP or 4-CHS monomers when making the polymer to form the copolymer.

The PVBP and PCHS polymers may also be polymerized in the presence other vinyl monomers (including but not limited to ethylene, styrene, methyl styrene, acrylate esters or methacrylate esters) and/or diene-containing monomers (including but not limited to butadiene, isoprene, dicyclopentadiene, divinyl benzene, ethylidenenorbornene, and vinyl norbornene) to improve the balance of properties. In any embodiment the PVBP and PCHS polymers, or the articles made therefrom, also comprise (or consisting essentially of) polymers made from 4-VBP or 4-CHS, optionally in combination with one or more additional polymerizable vinyl and/or diene monomers.

In any embodiment, copolymers including 4-VBP or 4-CHS and a comonomer such as divinyl benzene is formed as described herein for the homopolymer. Preferred copolymers comprise within a range from 0.01 or 0.1 wt % to 1, or 2, or 3, or 4, or 5 wt %, by weight of the polymer, or the comonomer derived units. A most preferred copolymer is poly(vinylbiphenyl) and poly(vinylcyclohexylstyrene) copolymers comprising within a range from 0.01 to 5 wt % divinylbenzene. Such copolymers may be branched, such as when divinyl benzene is the comonomer as this would provide branching points, and in particular, long chain branches (LCB). Such branched copolymers are shown herein to provide improved processability and thus may not need to be blended with other polymers to improve processing. This is evidenced in having a high complex viscosity (above 10,000 Pa☐s) at 0.001 or less shear (rad/sec) and low complex viscosity (below 1000 Pa☐s) at high shear such as 100 or more rad/sec. Such polymers are said to exhibit "shear thinning" The copolymers also exhibit "strain hardening" which is when dynamic frequency sweeps of the polymer show an increase in viscosity and preferably a plateau and/or eventual decrease (or peak) indicating no breakage of the polymer when under strain, which is advantageous when forming foamed materials.

Also, such copolymers exhibit in any embodiment a bimodal molecular weight profile such as elucidated by gel permeation chromatography (GPC), that is, by having high molecular weight shoulder or peak in a signal versus retention volume plot of a GPC chromatogram. Such bimodal behavior may be why the copolymers show strain hardening and shear thinning.

Finally, such copolymers exhibit in any embodiment a dual glass transition temperatures, most preferably a first within a range from 110° C. to 130, or 140° C., and a second within a range from 145° C. to 160, or 170, or 180° C., as measured by dynamic mechanical thermal analysis (DMTA).

In any embodiment the PVBP and PCHS polymers or blends thereof or articles comprising the PVBP and PCHS polymers or blends thereof exhibit extensional strain hardening at a temperature of at least 150, or 170, or 190, or 210° C., or within a range from 150, or 170, or 190, or 210° C. to 240, or 280, or 300° C. The extensional strain hardening is evidenced in plots such as in FIG. 1 and FIG. 2 wherein there is an increase in the viscosity above the LVE over time, preferably by at least 100, or 500, or 1000 MPa·sec at a given scan rate, most preferably within a range from 100, or 500, or 1000 MPa·sec to 2000, or 5000, or 10,000 MPa·sec.

In any embodiment the PVBP and PCHS polymers and copolymers are oriented by forming a fiber, a fabric, a foamed article, or a thermoformed article. In any embodiment the PVBP and PCHS polymers are oriented in the melted state at a temperature of at least 150, or 170, or 190, or 210° C., or within a range from 150, or 170, or 190, or 210° C. to 240, or 280, or 300° C.

The articles made of PVBP and PCHS polymers and copolymers, or blends thereof, may be cross-linked to enhance performance (such as thermal stability and durability). In any embodiment, any of these articles may be cross-linked, which can be effected by any means, including but not limited to chemical cross-linking (using cross-linking agents containing sulfur, peroxide, amine, halide, etc.) and radiation induced cross-linking (using radiation types such as electrons, x-rays, ions, neutrons, gamma-radiation, and ultraviolet).

The PVBP and PCHS polymers and copolymers, or blends thereof, can be formed into articles selected from tire cords, textiles, filtration media, carbon fiber precursors, industrial cords, insulation board, microwavable articles, insulation block, and building materials. In any embodiment, any of these articles may be foamed, which can be effected by any means but preferably by adding a foaming agent to the polymer and heating under the appropriate conditions to create cavitation in the melt.

EXAMPLES

Test methods and experimental procedures are described here. The various descriptive elements and numerical ranges disclosed herein for the inventive PVBP and PCHS polymers and articles made therefrom can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples. The testing methods used to test the polymers and films made therefrom are also described.

Differential Scanning Calorimetry. Glass transition temperatures (Tg) were measured by Differential Scanning calorimetry (DSC) carried out on the OBC and blends using a TA Instruments Model Q-200 differential scanning calorimeter. DSC measures the amount of energy absorbed or released by a sample when it is heated or cooled, providing quantitative and qualitative data on endothermic (heat absorption) and exothermic (heat evolution) processes. The sample was placed in a T-Zero Pan and encapsulated with a lid using a pan press. The sample pan was placed upon a disc on a platform in the DSC cell. An empty reference pan sits on a symmetric platform in the DSC cell. Heat flow was measured by comparing the difference in temperature across the sample and the reference. Sample sizes are from 3.5 mg to 7.5 mg. The samples were first cooled from 20 to −100° C. at a rate of 10° C./minute. The samples were then heated from −100° C. to 280° C. at a rate of 10° C./min. During both cooling and heating a nitrogen gas purge flow at a rate of 50 ml/min was maintained. Note that a single heating cycle was used to minimize potential polymer degradation since the polymers do not contain any heat stabilizing additives. All the DSC plots on cooling and heating were recorded. The glass transition temperature (Tg) was determined from the heating thermogram as described in ASTM E1356.

Dynamic Mechanical Thermal Analysis. Glass transition temperatures (Tg) were also measured by dynamic mechanical thermal analysis ("DMTA"). A strain-controlled rheometer ARES-G2 (TA Instruments) was used for dynamic temperature ramp measurements using 8 mm serrated parallel plate geometry. The specimens consist on 8 mm discs of the sample that are sandwiched between the plates and subjected to small-amplitude oscillatory shear flow with frequency of 1 Hz and strain amplitudes of 0.1% while the temperature is ramped down from 200 to 100° C. The rheometer software (TRIOS) calculates the dynamic elastic and viscous moduli (G' and G", respectively). The Tg value is determined as the temperature at which a maximum in the G" values is observed during the temperature ramp.

Molecular Weight Determinations. Gel Permeation Chromatography (GPC) was carried out using an Agilent™ GPC PL-220 apparatus with RI, LS and viscometer detectors on the homopolymers and copolymers to determine the number average molecular weight (Mn), and weight average molecular weight (Mw). The gel permeation column (PLgel 10 μm Mix-B) was calibrated with polystyrene and the mass was calibrated with NBS1475. For GPC measurements of the homopolymer and copolymer samples the molecular weight modeling was analyzed as a new polymer via the "Universal Calibration" method [Z. Grubisic, P. Rempp, and H. Benoit, 5(9) J. POLY. SCI. PART B: POLY. LET., 753-759 (1967)], using a polystyrene standards and an intrinsic viscosity detector. In this study the type of detectors used were DRI (especially for the determination of Mn) and MALLS (infrared, especially for the determination of Mw) but light scattering (LS) and differential pressure (DP) were also measured and shown in FIG. 3A and FIG. 3B; the temperature of elution was 145° C.; the solvent of elution was trichlorobenzene (TCB); the rate of elution was 0.5 ml/min; the MH constants (DRI) used were K=0.000579, α=0.695; and the MH constants (IR) used were K=0.000175, α=0.670; the determination of Mn is within ±100 g/mole, and Mw is ±500 g/mole.

Flexural Modulus. Flexural modulus measurements are based on the methodology described in ASTM D790, Method A, but with modifications that allow for smaller specimens to be used. The method is a three point bending test using ISO 37 Type 3 miniature tensile specimens conducted on an Instron testing machine equipped with a 1 kN load cell. Specimen thickness is reported as the average of six measurements made on the tab areas of the specimens. A minimum of two specimens are used for the testing. Specimens are placed on a standard bending fixture with a support span of 30 mm and undergo deflection by contact with a flexure probe driven by the testing machine at a rate of 1.0 mm/minute. The geometry of the support fixture and the probe are as described in ASTM D790. Flexural modulus (1% secant modulus) is reported as the stress at 1% flexural strain as described in ASTM D790. No environmental control during testing or specimen conditioning before testing was performed; however, testing was only carried out if the laboratory temperature was between 19.4 to 23.3° C. The temperature at the time of testing was reported along with results.

Tensile Properties (Break Strength and Ultimate Elongation). Tensile properties are the engineering stress and strain based on the load and elongation at break when a specimen is deformed in uniaxial tension. These properties are measured based on the methodology described in ASTM D638, but with modifications that allow for smaller specimens to be used. The method uses ISO 37 Type 3 miniature tensile specimens marked with two 1-2 mm diameter paint dots about 10 mm apart in the gage region of the specimen. Specimen thickness is reported as the average of three measurements made in the gage area of the specimens. A minimum of two specimens are used for the testing. Testing was performed using an Instron tensile testing machine equipped with a video extensometer with a grip separation of 30 mm and crosshead separation rate of 50 mm/minute. Load was measured with a 2 kN load cell and strain measurements are made by the video system as it tracks the movement of the dots on the specimens. Calculation of strength at break and ultimate elongation follow the guidelines of ASTM D638. No environmental control during testing or specimen conditioning before testing was performed; however, testing was only carried out if the laboratory temperature was between 19.4 to 23.3° C. The temperature at the time of testing is reported along with results.

Notched Izod Impact Strength. Notched Izod impact strength is a measure of the resistance of a material to breakage by flexural shock as indicated by the energy extracted from standardized pendulum type hammers, mounted in a standardized machine, in breaking standard specimens with one pendulum swing. The test is based on the methodology described in ASTM D256, but with modifications that allow for smaller specimens to be used. A key difference is that test specimens are injection molded directly (2.5×0.5×0.125 inch rectangular bar) using a miniature injection molding machine; ASTM D256 calls for cutting test specimens from the center portion of larger D638 tensile specimens. Thickness measurement and notching are as described in ASTM D256. Testing was performed using a CEAST/Instron Impact Tester equipped with a 2.75 J hammer. Typically, a minimum of four specimens are tested and the break energy reported is an average of the four measurements. No environmental control during testing or specimen conditioning before testing was performed; however, testing was only carried out if the laboratory temperature was between 19.4 to 23.3° C. The temperature at the time of testing is reported along with results.

Heat Deflection Temperature (HDT)/Deflection Temperature Under Load (DTUL). This test measures the resistance to bending of a material when loaded in three point bending (flexure) over a temperature range. The reported result is the temperature at which a specified deflection is attained under a specified loading condition. This testing was performed in a non-standard manner, necessitated by the limited amount of experimental polymer available. The test specimen was an injection molded ISO 37 Type 3 miniature tensile specimen loaded in flexure flatwise on a three point fixture with a 10 mm support span. The fixture was mounted in the oven of a TA Instruments RSA-G5 dynamic mechanical analysis (DMA) instrument. A force was applied to the specimen to produce a stress of 1.82 MPa (264 psi); for a 2 mm thick×4 mm wide specimen, the required force is 1.94 N (force=2× stress×width×specimen thickness$^{(2/3)}$×support span). The temperature of the oven was then raised at a rate of 2° C./minute until a specified deflection was observed. ASTM D648, Method B calls for a deflection of 0.25 mm; this is equivalent to a flexural strain of 0.0019 mm/mm (strain=6× deflection×specimen thickness/support span$^2$). For consistency with the ASTM method, the test was run until the specimen achieves the same strain (0.0019 mm/mm) which occurs at a deflection of 0.1 mm. The temperature at which this occurs was reported as the 264 psi heat deflection temperature. Two specimens are tested and the result reported is the average of the two determinations.

TGA Degradation Onset. This test measures the onset temperature of weight loss due to thermal degradation. The methodology was based on ASTM E1131. Testing was performed using a TA Instruments Q500 thermogravimetric analyzer (TGA). A sample weighing 10 to 30 mg was placed in the TGA pan and nitrogen purge gas flow of 50 ml/minute is established. The temperature was then raised at 10° C./minute to 600° C. The gas was then switched to oxygen and temperature was raised at 10° C./minute to 750° C. The thermogram of weight vs. time was recorded, and the temperature of onset of weight loss due to degradation was reported. A single replicate measurement was made.

Density. Density measurements of injection molded specimens were made by the water immersion weight technique as described in ASTM D792. In this technique, the specimen was weighed both dry and immersed in water. The volume of the specimen can be determined from the weight difference using Archimedes' Principle which states that an immersed object is buoyed up by a force equal to the amount of fluid it displaces. For this measurement, injection molded ISO 37 Type 3 miniature tensile specimens were used; the specimens weigh about 1 gram. Procedures and calculations are as described in ASTM D792. The value reported was the average of two measurements on different samples.

Figure 2:
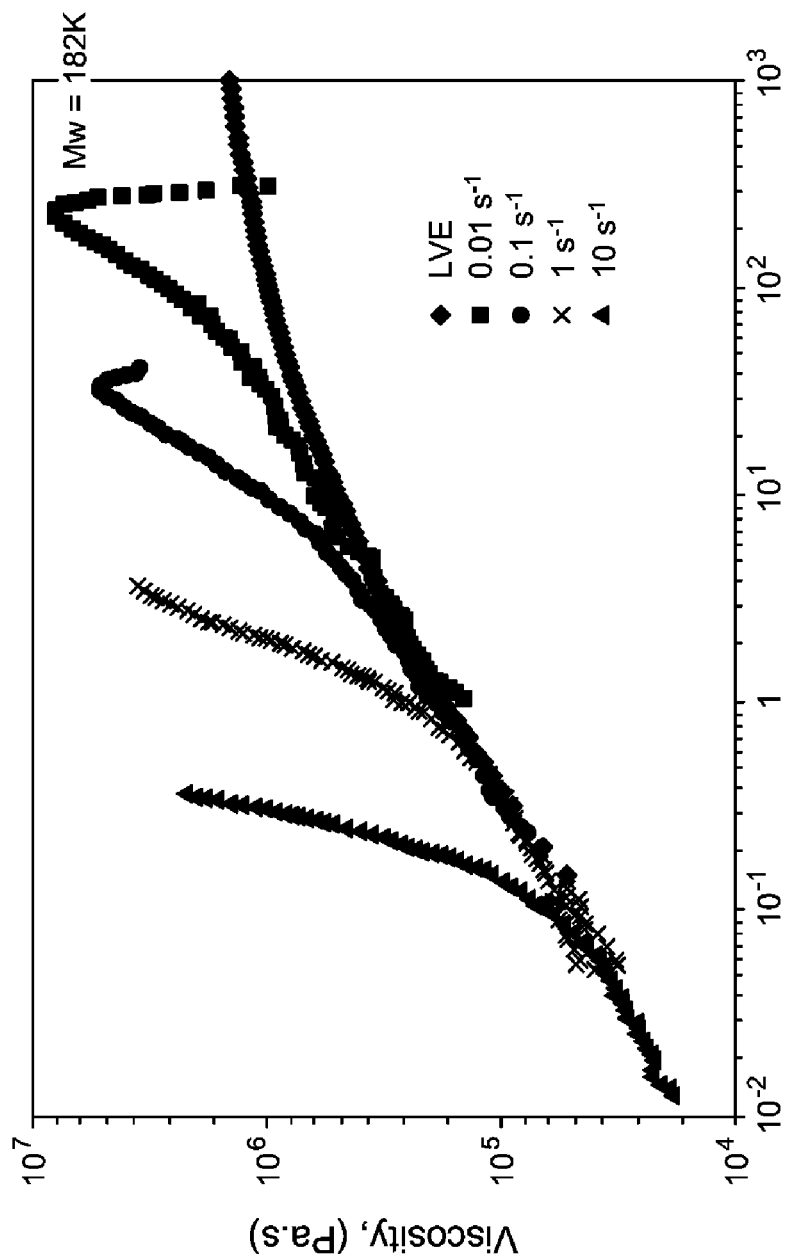
FIG. 2 shows extensional strain hardening during start-up experiments performed and the indicated Hencky strain rates for PCHS examples.

Extensional Strain Hardening. The extensional strain hardening shown in traces in FIGS. 1 and 2 were obtained using a Sentmanat Extensional Rheometer (SER), mounted on a strain-controlled rheometer (ARES-G2, TA Instruments). All the measurements were performed at 190° C., under nitrogen atmosphere. The symbols in FIG. 1 and FIG. 2 are the measured extensional strain hardening data, whereas the solid lines (or black diamond data representing a level curve) are predictions to the linear viscoelastic behavior (LVE) using data from oscillatory shear rheology and the Doi-Edwards model.

Shear Thinning. Small Angle Oscillatory Spectroscopy (SAOS) was performed on the inventive samples of copolymer, traces for which are shown in FIG. 2. Prepared using hot press (either a Carver Press or Wabash Press) polymer samples were disks of 25 mm in diameter and 2.5 mm in thickness. In order to characterize the shear thinning behavior the rheometer ARES-G2 (TA Instruments) was used to conduct small angle oscillatory shear measurements at angular frequency ranging from 0.01 to 500 rad/s at temperatures ranging from 160° C. to 250° C. and at a fixed strain of 10%. The dynamic moduli data measured at different temperature are shifted horizontally to construct a dynamic master curves using the time-temperature superposition principle, with a reference temperature $T_0$=190° C. The dynamic moduli data was then converted into viscosity as function of frequency. To ensure that selected strain provides measurements within linear deformation range the strain sweep measurements have been conducted (at angular frequency of 100 Hz). Data was processed using Trios software.

Synthesis of PVBP. The PVBP was either synthesized as described in Table 1 or purchased as indicated. PVBP samples were prepared by free radical polymerization, both in solution and in bulk, and by anionic polymerization. Reactions in solution were carried out in toluene (30 wt % solutions) at 100° C., with different amounts of azobisisobutylronitrile (AIBN) (see table below). The reaction in bulk was carried out at 130° C. in a vacuum oven with nitrogen atmosphere, for at least 8 hrs. Additional samples prepared by free radical polymerization were purchased from Pressure Chemical (reaction processes not known) and Aldrich (reaction process not known). The sample prepared by anionic polymerization was purchased from Polymer Source, Inc. The molecular characteristics of these polymers are given in the table below.

The PVBP samples were made by free radical polymerization (both in solution and in bulk) and are highly transparent. The polymers are completely amorphous and their glass transition (measured by DSC) is greater than 100° C. (See Table 1). The PVBP mechanical properties of selected samples are shown in Table 2. Typical comparable properties are also shown for poly(methyl methacrylate) (PMMA) and polycarbonate (PC). The experimental PVBP polymers are generally similar to or better in flexural stiffness than PC, but less stiff than PMMA. Tensile strength varies depending on the particular sample, but is generally about 60% that of PC and about 50% that of PMMA. Impact strength is negligible compared to PC and PMMA. HDT (measured on one sample) was slightly less than PC, but significantly better than PMMA. Thermal stability by TGA is better than PMMA, but considerably less than that of PC. Density is about 10% less than PC and PMMA.

TABLE 1

PVBP Reaction and Polymer Properties

| Polymer ID | Reaction type | AIBN/ 4-VBP w/w ratio | Mw (kg/mole) | Mw/Mn | Tg (° C.) |
|---|---|---|---|---|---|
| 1 | Free Rad | — | 344 | 2.44 | 154.3 |
| 2 | Free Rad | — | 666 | 2.54 | 146.6 |
| 3 | Free Rad | — | 271 | 2.07 | 152.6 |
| 4 | Free Rad | — | 250 | 2.14 | 152.5 |
| 5 Scientific Polymer Products | — | — | 56.4 | 4.16 | 142.4 |
| 6 Aldrich | — | — | 60.2 | 4.27 | — |
| 7 Polymer Source | Anionic | — | 707 | 1.71 | 155.6 |
| 8 | Free Rad | — | — | — | 133.8 |
| 9 | Free Rad | 0.01 | 29.6 | 2.04 | 134.0 |
| 10 | Free Rad | 0.002 | 55.7 | 2.05 | — |
| 11 | Free Rad | 0.0005 | 89.9 | 1.9 | 148.6 |
| 12 | Free Rad | 0.03 | 21.25 | 3.25 | 134.5 |
| 13 | Free Rad | 0.0002 | 251.3 | 2.1 | 154.2 |
| 14 | Free Rad | 0 | 395 | 4.4 | 136.8 |

TABLE 2

Mechanical Properties of some PVBP and comparative polymers

| Property | 4 | 6 | 12 | 13 | PC (typical) | PMMA (typical) |
|---|---|---|---|---|---|---|
| Appearance | opaque | transparent | translucent | transparent | transparent | transparent |
| Color | white | lt. gray | yellow-brown | v. sl. yellow | v. sl. yellow | water white |
| Mn (kg/mole) | 117 | 413 | 120 | 90 | 30 | 60 |
| Mw (kg/mole) | 250 | 707 | 251 | 395 | 75 | 110 |
| Mw/Mn | 2.14 | 1.71 | 2.1 | 4.4 | 2.5 | 1.8 |
| Flex Modulus (MPa) | 2470 | 2610 | 2310 | 2640 | 2450 | 3490 |
| Tensile Break (MPa) | 15.1 | 38.6 | 7.77 | 41.3 | 63.5 | 84 |
| Ult. Elongation (%) | 0.6 | 1.7 | 0.14 | 1.9 | 100 | 5 |
| 25° C. Not'd Izod (fpi) | 0.1 | 0.11 | 0.12 | 0.1 | 18 | 0.4 |
| Tg (° C.) | 152.5 | 143.0 | — | 136.8 | 143 | 105 |
| HDT (264 psi, ° C.) | 111.4 | — | — | — | 120 | 65 |
| TGA Degradation Onset (° C.) | — | — | — | 344.9 | 482 | 327 |
| Density (g/cm³) | 1.09 | 1.10 | 1.10 | 1.10 | 1.20 | 1.19 |

The most remarkable property of the PVBP polymers is their melt response to elongational flow. FIG. 1 shows two examples of extensional strain hardening during start-up experiments performed and the indicated Hencky strain rates. The deviations from the linear viscoelastic envelope (LVE) lines (solid black lines or black diamond data points to the flat curve) is a measure of strain hardening. Strong strain hardening is observed at all rates in both samples shown in FIG. 1. This response implies good processability in operations involving extensional flow (e.g., thermoforming, foaming, and blow molding) and the ability to generate a foamed article. One potential application for these materials is in expanded polymers formed by commercial foaming processes for insulation to replace expanded polystyrene and Styrofoam. The good processability combined with the high Tg of these polymers provide advantages over polystyrene foams.

Synthesis of PCHS. PCHS was prepared by free radical polymerization, either in solution or in bulk. A typical procedure involves passing the CHS monomer through a pre-packed inhibitor remover column (Aldrich), dissolving 50 g CHS monomer in 500 mL anhydrous toluene in a 1 L round-bottom flask equipped with a condenser, purging the mixture with nitrogen, and initiating the polymerization by adding 10 mg recrystallized azobisisobutylronitrile (AIBN) initiator. The reaction mixture is stirred and heated at 100° C. under nitrogen protection for 24 hours, followed by precipitation to 4 L methanol. The polymer product is recovered by filtration. The polymer is then washed with fresh methanol several times, and dried in vacuum oven at 80° C. until constant weight. The polymer is fully characterized by NMR, GPC, DSC, and TGA.

The PCHS polymers made by free radical polymerization are highly transparent. The polymers are completely amorphous. The properties of selected samples are shown in Table 3, compared to poly(methyl methacrylate) (PMMA) and polycarbonate (PC). The PCHS polymers are generally similar in flexural stiffness to PC, but less stiff than PMMA. Tensile strength is generally about 10 to 30% that of PC and about 10 to 20% that of PMMA. Impact strength is negligible compared to PC and PMMA. Thermal stability by TGA is better than PMMA, but less than that of PC. The PC had a very slight yellow color, while the other polymers are colorless. Density of the PCHS was about 16% less than PC and PMMA.

TABLE 3

Physical Properties of PCHS and Comparable Commercial Polymers

| Property | PCHS | PC (typical) | PMMA (typical) |
|---|---|---|---|
| Appearance | transparent | transparent | transparent |
| Color | colorless | v. sl. yellow | colorless |
| Mn (kg/mole) | 86 | 30 | 60 |
| Mw (kg/mole) | 182 | 75 | 110 |
| Mw/Mn | 2.11 | 2.5 | 1.8 |
| Flexural modulus (MPa) | 2030 | 2450 | 3490 |
| Tensile strength at break (MPa) | 6.7 | 63.5 | 84 |
| Ultimate elongation (%) | 1.5 | 100 | 5 |
| Tg (° C.) | 135 | 143 | 105 |
| TGA Degradation Onset (° C.) | 416 | 482 | 327 |
| Density (g/cm³) | 1.02 | 1.20 | 1.19 |

The most remarkable property of the PCHS polymers is their melt response to elongational flow. FIG. 2 shows extensional strain hardening during start-up experiments performed and the indicated Hencky strain rates. The deviations from the linear viscoelastic envelop (LVE) lines (diamond-shaped data points) is a measure of strain hardening. A strong strain hardening is observed at all rates. This response implies good processability in operations involving extensional flow (e.g., thermoforming, foaming, and blow molding). One potential application for these materials is in expanded polymers formed by commercial foaming processes for insulation to replace expanded polystyrene. The good processability combined with the high Tg of these polymers provide advantages over polystyrene foams.

Synthesis of DVB Copolymers. A second set of experiments were carried out to demonstrate the ability to form random copolymers of 4-vinylbiphenyl (VBP) and divinylbenzene (DVB). Two exemplary copolymers were synthesized via free radical copolymerization using AIBN or BPO (benzoyl peroxide) as initiators. Less than 1 wt % of DVB was mixed with 4-VBP monomer and dissolved in the toluene. The solution was heated to 100° C. and the initiator is added. The reaction was allowed to proceed for 24 hrs. Two copolymers were produced as examples in Table 4. The examples are referred to as "example 1" or "bPVBP01" and "example 2" or "bPVBP02".

TABLE 4

Polymerization of the two monomers to form copolymer

| Sample No. | VBP monomer | DVB (1.1% Solution) | DVB wt % | AIBN |
|---|---|---|---|---|
| 1 | 50 g | 5 ml | 0.1 | 10 mg |
| 2 | 50 g | 15 ml | 0.3 | 10 mg |

Figure 3A:
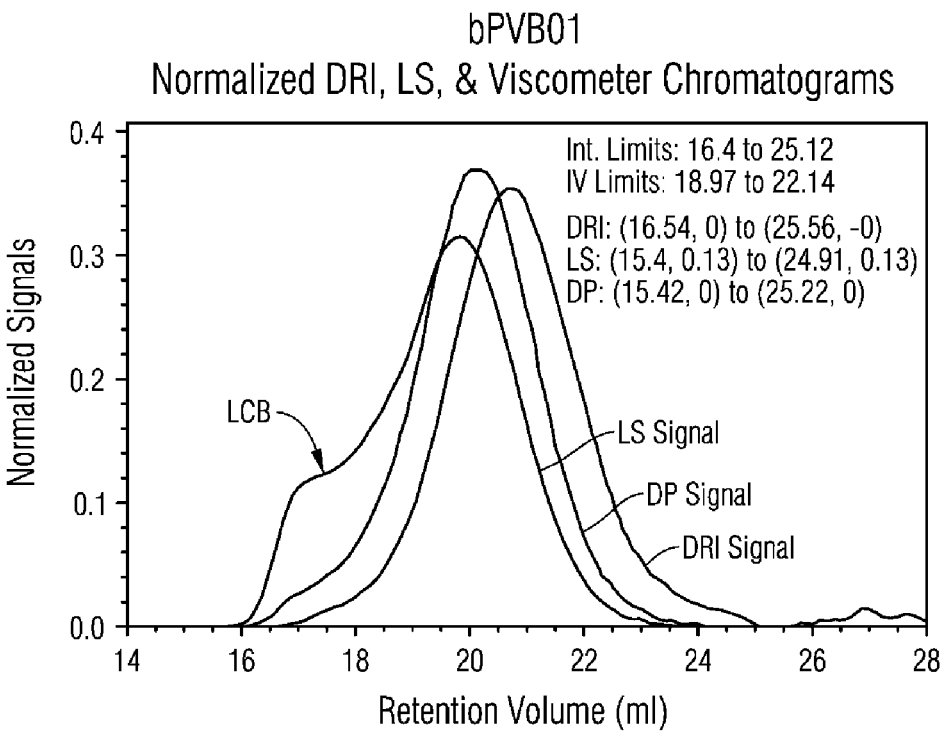
FIG. 3A and FIG. 3B are gel permeation chromatograms (GPC) traces of normalized signal as a function of volume for divinyl benzene copolymers of 4-VBP examples 1 and 2, respectively.
Figure 3B:
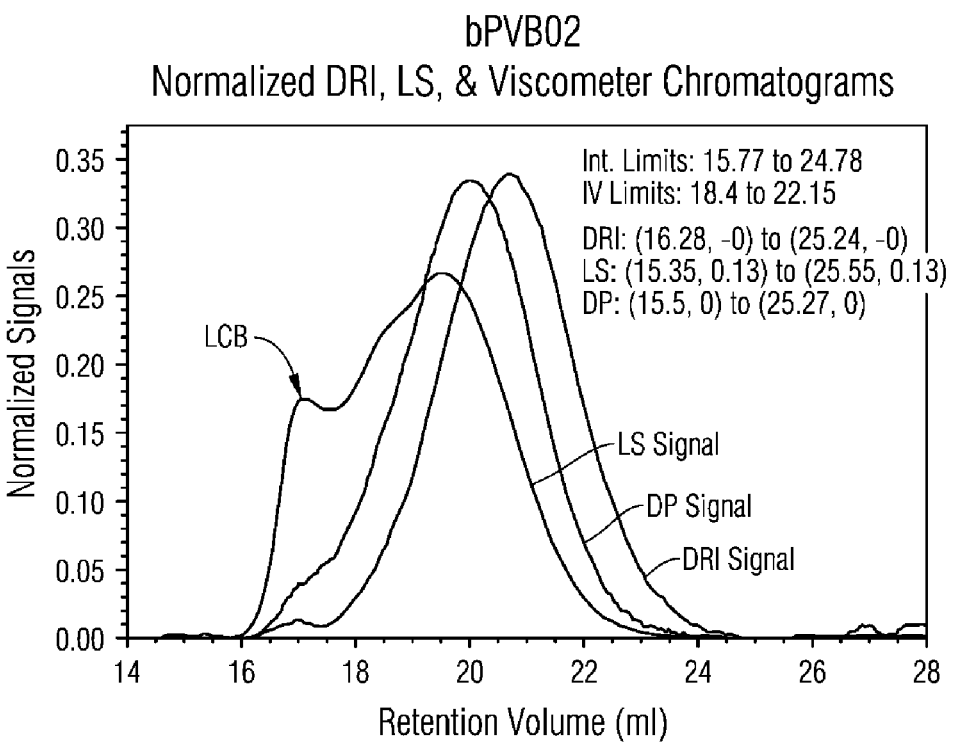

The FIG. 3A and FIG. 3B show the GPC data for these two samples and the Table 5 shows the values of Mn, Mw and Mw/Mn. GPC data demonstrates a bimodal distribution with a high MW shoulder corresponding to the branched PVBP fraction.

TABLE 5

GPC Results for the copolymer

| GPC parameter | 1 | 2 |
|---|---|---|
| DVB wt % | 0.1 | 0.3 |
| Mn (DRI), kg/mole | 78.4 | 113 |
| Mw (IR), kg/mole | 313 | 542 |
| Mw/Mn | 4.0 | 4.8 |

Figure 4A:
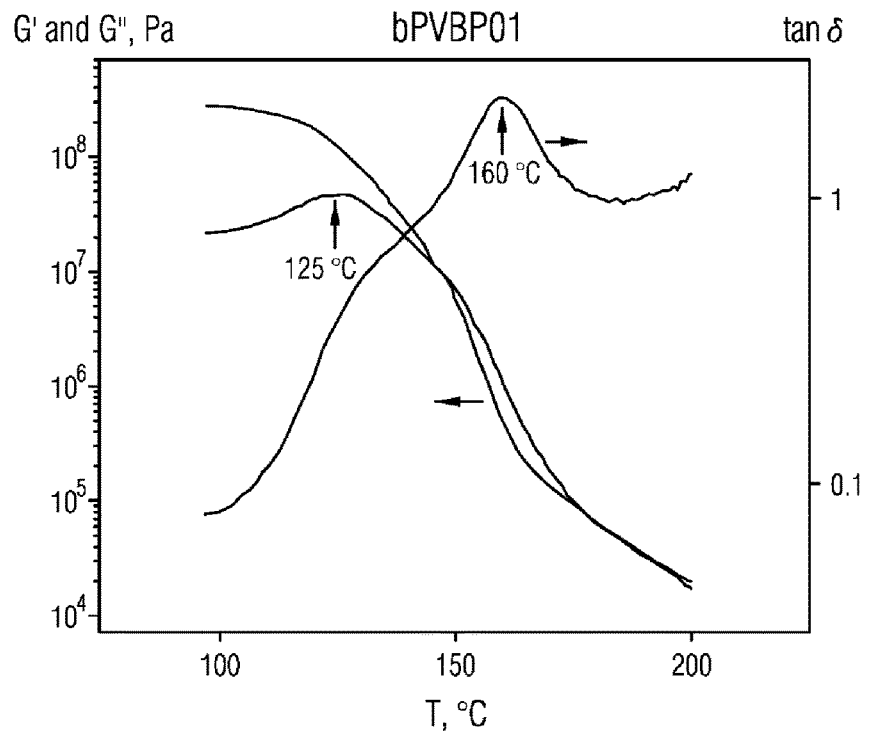
FIG. 4A, FIG. 4B, and FIG. 4C are dynamic mechanical temperature analysis (DMTA) plots for example 1 and 2 copolymers, and PVBP homopolymer, respectively.
Figure 4B:
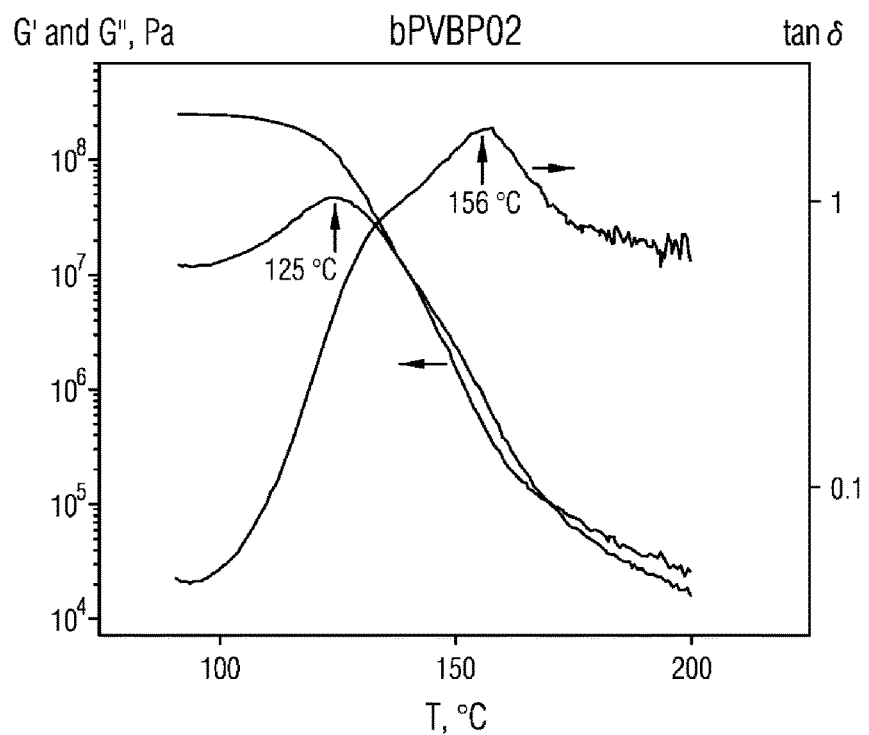
Figure 4C:
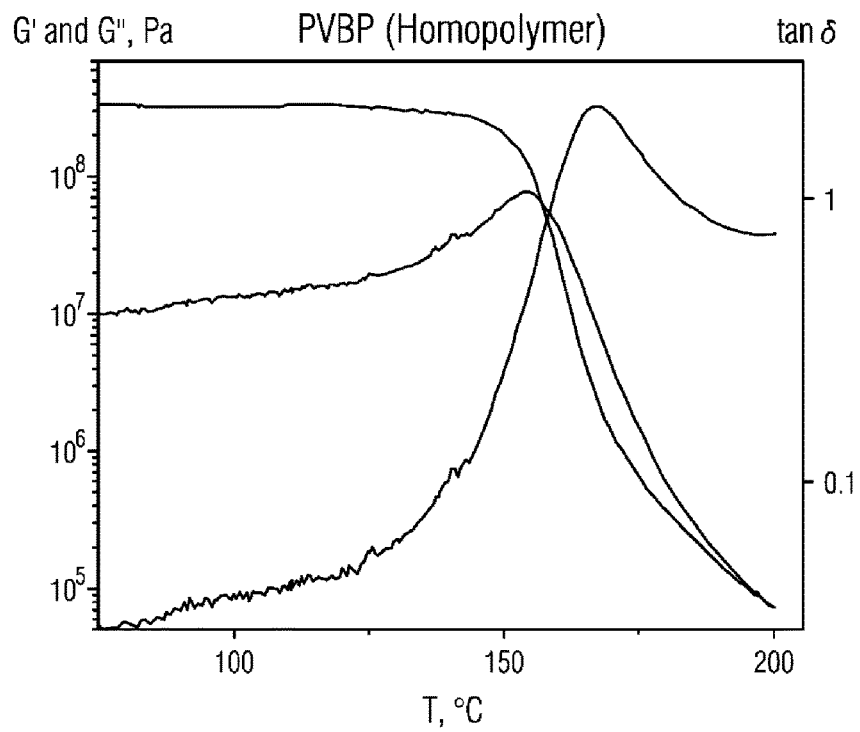

The thermal behavior was measured by DMTA (plot shown below). The two bPVBP samples show very broad glass transition temperatures characterized by two peaks in G″ and tan delta, respectively, indicated by arrows in FIG. 4A, FIG. 4B, and FIG. 4C. As a reference, PVBP homopolymer shows a single transition (Tg~154° C.). The origin of these transitions is not clear, but the transition staring at 125° C. could be beneficial for the processing behavior of these materials.

Figure 5A:
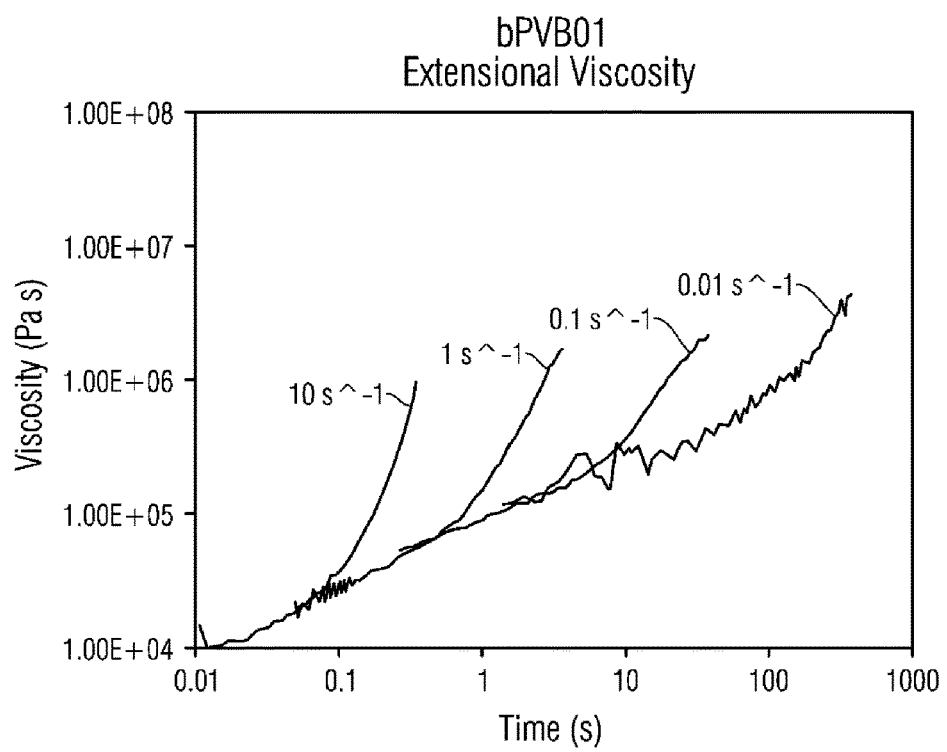
FIG. 5A and FIG. 5B are Hencky strain rates at 0.1, 1 and 10/sec sweeps of the example 1 and 2 DVB copolymers.
Figure 5B:
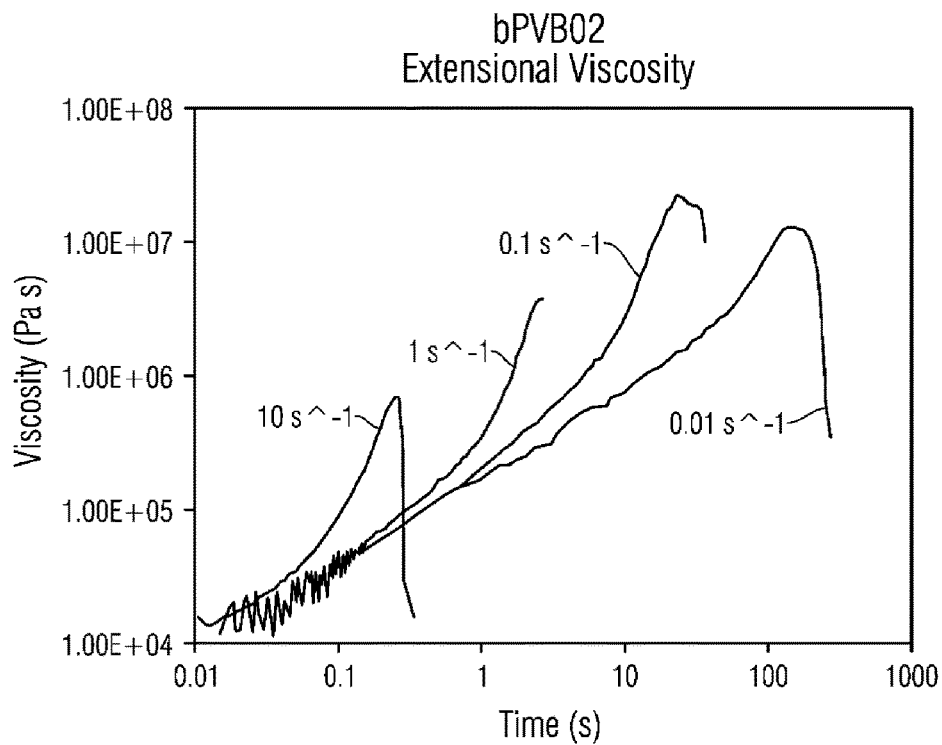
Figure 5C:
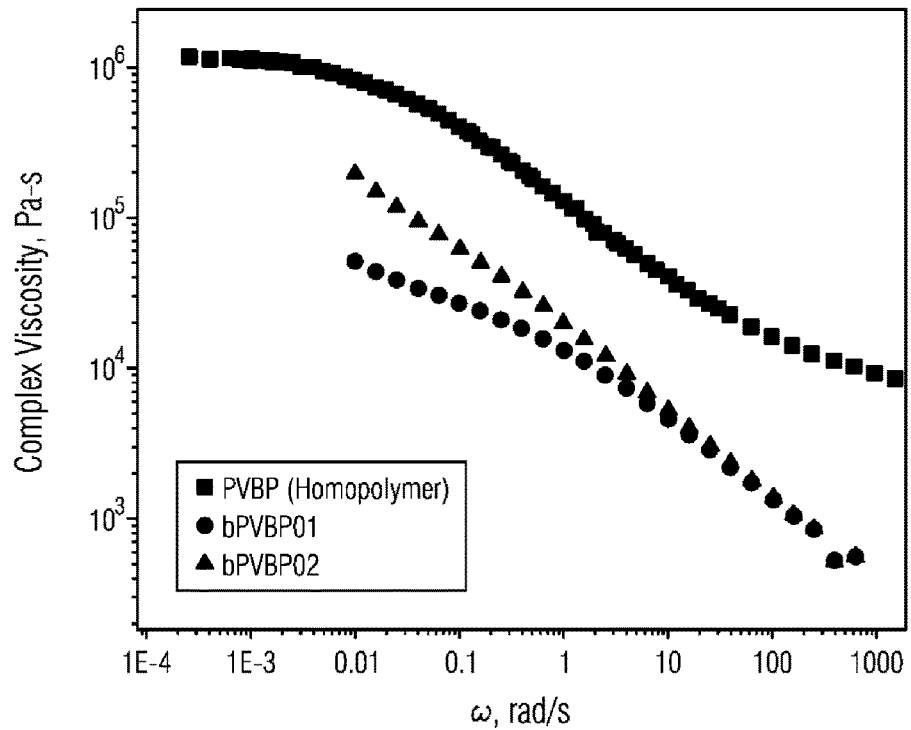
FIG. 5C is a SAOS study resulting in a plot of complex viscosity as a function of strain sweeps of the PVBP homopolymer (square data points, top curve) and example 1 and 2 DVB copolymers (triangle and circle, respectively).

The dynamic frequency sweeps shown in the data plots of FIG. 5C of the branched PVBP copolymers show very strong shear-thinning behavior, even stronger that in PBVP homopolymer. This indicates good processability under shear operations (e.g., during extrusion). Additionally, strong strain hardening is observed in FIG. 5A and FIG. 5B, which is stronger for the higher DVB content sample. This response implies good processability in operations involving extensional flow (e.g., thermoforming, foaming, and blow molding). One potential application for these materials is in expanded polymers formed by commercial foaming processes for insulation to replace expanded polystyrene and Styrofoam. The good processability combined with the high Tg of these polymers provide advantages over polystyrene foams.

Finally, the data in Table 6 below highlights mechanical properties of the copolymer. The flexural modulus and the room temperature notched Izod impact strength (RTNI) for a homopolymer PVBP and the two branched PVBP samples were measured. Note that the 1% flexural moduli were not reported as such because the specimens did not reach 1% flexural strain before breaking. The value shown represents stiffness (more than the homopolymer), but the polymers are very brittle and cannot be tested to 1% flexural strain. A remarkable result is that the impact strength is much improved as compared to the homopolymer in spite of the brittleness. This indicates that the microstructure of the branched PVBP samples contains some energy absorbing features. This can be rationalized by the fact that the long branches act as energy absorbers by generating highly entangled networks. This is supported by the fact that melt elasticity of these sample also increases as shown in the dynamic frequency sweeps above.

TABLE 6

Mechanical Properties of the Copolymer compared to Homopolymer

| Property | PVBP homopolymer | 1 | 2 |
|---|---|---|---|
| 1% flexural modulus (MPa) | 2640 | 2900 (1) | 2770 (2) |
| RTNI (fpi) | 0.1 | 0.528 | 0.566 |

(1) Estimated; broke at 0.8%
(2) Estimated; broke at 0.7%

Having described the various features of the inventive polymers and articles made therefrom, described here in numbered embodiments is:

P1. An article comprising polymers selected from the group consisting of poly(vinylbiphenyl), poly(vinylcyclohexylstyrene), substituted versions thereof, and blends thereof, the polymer having a weight average molecular weight (Mw) of at least 100 kg/mole and a glass transition temperature (Tg) of at least 100° C.

P2. The article of the previous numbered paragraph, wherein the polymer or polymer blend has a flexural modulus of at least 2000 MPa.

P3. The article of any one of the previous numbered paragraphs, wherein the polymer or polymer blend has a tensile strength at break within the range from 5 MPa to 100 MPa.

P4. The article of any one of the previous numbered paragraphs, wherein the polymer or polymer blend has a Tg within a range from 100° C. to 200° C.

P5. The article of any one of the previous numbered paragraphs, wherein the PVBP or PCHS polymer has an Mw within a range from 100 kg/mole to 1000 kg/mole.

P6. The article of any one of the previous numbered paragraphs, wherein the PVBP or PCHS polymer has an Mw/Mn value within the range from 1.5 to 5.

P7. The article of any one of the previous numbered paragraphs, also comprising poly(phenylene oxide), a diene elastomer, or a combination of the two.

P8. The article of any one of the previous numbered paragraphs, wherein poly(vinylbiphenyl), poly(vinylcyclohexylstyrene) are copolymers comprising within a range from 0.01 to 5 wt % of a polymerizable comonomer, preferably divinylbenzene.

P9. The article of any one of the previous numbered paragraphs, also comprising vinyl monomers and/or dienes-containing monomers.

P10. The article of any one of the previous numbered paragraphs, wherein the polymer or polymer blend exhibits extensional strain hardening at a temperature of at least 150° C.

P11. The article of any one of the previous numbered paragraphs, wherein the polymer or polymer blend exhibits an increase in the viscosity above the LVE over time of at least 100 MPa·sec at a given scan rate.

P12. The article of any one of the previous numbered paragraphs, wherein the polymer or polymer blend is oriented by forming a fiber, a fabric, a foamed article, or a thermoformed article.

P13. The article of any one of the previous numbered paragraphs, wherein the polymer or polymer blend is oriented in the melted state at a temperature of at least 150° C. to form the article.

P14. The article of any one of the previous numbered paragraphs, wherein the polymer or polymer blend is cross-linked.

P15. An article selected from tire cords, textiles, filtration media, carbon fiber precursors, industrial cords, insulation board, microwavable articles, insulation block, and building materials comprising the oriented article of any one of the previous numbered paragraphs.

P16. A process to form the polymers of any one of the preceding numbered paragraphs comprising combining 4-vinyl-biphenyl and/or 4-vinyl-cyclohexylstyrene and an initiator, wherein the level of such initiator in the reaction with the monomer is within a range from 0.0001 to 0.01 weight initiator/weight monomer ratio.

As used herein, "consisting essentially of" means that the claimed article or polymer blend includes only the named components and no additional components that will alter its measured properties by any more than 20%, and most preferably means that additional components are present to a level of less than 5, or 4, or 3, or 2 wt % by weight of the composition. Such additional components can include, for example, fillers, colorants, antioxidants, anti-UV additives, curatives and cross-linking agents, aliphatic and/or cyclic containing oligomers or polymers, often referred to as hydrocarbon polyethylenes, and other additives well known in the art. As it relates to a process, the phrase "consisting essentially of" means that there are no other process features that will alter the claimed properties of the polymer, polymer blend or article produced therefrom by any more than 10 or 20%.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. An article comprising polymers selected from the group consisting of poly(vinylbiphenyl), poly(vinylcyclohexylstyrene), substituted poly(vinylbiphenyl), substituted poly(vinylcyclohexylstyrene), and blends thereof, the polymer having a weight average molecular weight (Mw) of at least 100 kg/mole and a glass transition temperature (Tg) of at least 100° C., wherein: 1) the polymer or polymer blend exhibits extensional strain hardening at a temperature of at least 150° C., and 2) the polymers are copolymers comprising within a range from 0.01 to 5 wt % divinylbenzene.

2. The article of claim 1, wherein the polymer or polymer blend has a flexural modulus of at least 2000 MPa.

3. The article of claim 1, wherein the polymer or polymer blend has a Tg within a range from 100° C. to 200° C.

4. The article of claim 1, wherein the polymer has an Mw within a range from 100 kg/mole to 1000 kg/mole.

5. The article of claim 1, wherein the polymer has an Mw/Mn value within the range from 1.5 to 5.

6. An article comprising: 1) polymers selected from the group consisting of poly(vinylbiphenyl), poly(vinylcyclohexylstyrene), substituted poly(vinylbiphenyl), substituted poly(vinylcyclohexylstyrene), and blends thereof, the polymer having a weight average molecular weight (Mw) of at least 100 kg/mole and a glass transition temperature (Tg) of at least 100° C., wherein the polymer or polymer blend exhibits extensional strain hardening at a temperature of at least 150° C.; and 2) poly(phenylene oxide), a diene elastomer, or a combination of the two.

7. An article comprising polymers selected from the group consisting of poly(vinylbiphenyl), poly(vinylcyclohexylstyrene), substituted poly(vinylbiphenyl), substituted poly(vinylcyclohexylstyrene), and blends thereof, the polymer having a weight average molecular weight (Mw) of at least 100 kg/mole and a glass transition temperature (Tg) of at least 100° C., wherein the polymer or polymer blend exhibits extensional strain hardening at a temperature of at least 150° C., wherein the poly(vinylbiphenyl), poly(vinylcyclohexylstyrene), substituted poly(vinylbiphenyl), and substituted poly(vinylcyclohexylstyrene) polymers are copolymers comprising within a range from 0.1 to 5 wt % divinylbenzene.

8. The article of claim 1, wherein the polymer or polymer blend exhibits extensional strain hardening at a temperature of at least 170° C.

9. The article of claim 1, wherein the polymer or polymer blend exhibits an increase in the viscosity above the LVE over time of at least 100 MPa·sec at a given scan rate.

10. The article of claim 1, wherein the polymer or polymer blend is oriented when forming a fiber, a fabric, a foamed article, or a thermoformed article.

11. A process to form the polymers of claim 1 comprising combining 4-vinyl-biphenyl and/or 4-vinyl-cyclohexylstyrene and an initiator, wherein the level of such initiator in the reaction with the monomer is within a range from 0.0001 to 0.01 weight initiator/weight monomer ratio.

12. An article comprising: 1) polymers selected from the group consisting of poly(vinylbiphenyl), poly(vinylcyclohexylstyrene), substituted poly(vinylbiphenyl), substituted poly(vinylcyclohexylstyrene), and blends thereof, the polymer having a weight average molecular weight (Mw) of at least 100 kg/mole and a glass transition temperature (Tg) of at least 100° C., wherein the polymer or polymer blend exhibits extensional strain hardening at a temperature of at least 150° C.; and 2) poly(phenylene oxide) and a diene elastomer.

13. An article comprising: 1) polymers selected from the group consisting of poly(vinylbiphenyl), poly(vinylcyclohexylstyrene), substituted poly(vinylbiphenyl), substituted poly(vinylcyclohexylstyrene), and blends thereof, the polymer having a weight average molecular weight (Mw) of at least 100 kg/mole and a glass transition temperature (Tg) of at least 100° C., wherein the polymer or polymer blend exhibits extensional strain hardening at a temperature of at least 150° C.; and 2) poly(phenylene oxide).

14. An article comprising: 1) polymers selected from the group consisting of poly(vinylbiphenyl), poly(vinylcyclohexylstyrene), substituted poly(vinylbiphenyl), substituted poly(vinylcyclohexylstyrene), and blends thereof, the polymer having a weight average molecular weight (Mw) of at least 100 kg/mole and a glass transition temperature (Tg) of at least 100° C., wherein the polymer or polymer blend exhibits extensional strain hardening at a temperature of at least 150° C.; and 2) diene elastomer.

15. The article of claim 1, wherein the polymers are selected from the group consisting of poly(vinylbiphenyl), poly(vinylcyclohexylstyrene), and blends thereof.

16. An article comprising polymers selected from the group consisting of poly(vinylbiphenyl), poly(vinylcyclohexylstyrene), substituted versions thereof, and blends thereof, where the term "substituted versions thereof" means the poly(vinylbiphenyl) and the poly(vinylcyclohexylstyrene) have one or more hydrogen atoms substituted for another atom or moiety selected from the group consisting of C1 to C6, or C10 alkyl, C6 to C20 aryl, C7 to C22 alkylaryl, C7 to C22 arylalkyl, C1 to C6 or C10 alkoxy, hydroxyl group, carboxy group, amine group, halogen, and combinations thereof, and the polymers are copolymers comprising within a range from 0.01 to 5 wt % divinylbenzene, have a weight average molecular weight (Mw) of at least 100 kg/mole, a glass transition temperature (Tg) of at least 100° C., and the polymer or polymer blend exhibits extensional strain hardening at a temperature of at least 150° C.

17. An article comprising polymers selected from the group consisting of poly(vinylbiphenyl), poly(vinylcyclohexylstyrene), substituted poly(vinylbiphenyl), substituted poly(vinylcyclohexylstyrene), and blends thereof, wherein:
1) the polymer has a weight average molecular weight (Mw) of 100 to 1000 kg/mole
2) the polymer has a glass transition temperature (Tg) of from 100° C. to 200° C.,
3) the polymer or polymer blend exhibits extensional strain hardening at a temperature of at least 170° C.;
4) the polymer or polymer blend has a flexural modulus of at least 2000 MPa;
5) the polymer is a copolymer comprising from 0.01 to 5 wt % divinylbenzene; and
6) the polymer has an Mw/Mn value within the range from 1.5 to 5.

18. The article of claim 1, also comprising poly(phenylene oxide), a diene elastomer, or a combination of the two.

19. The article of claim 10, wherein the polymer or polymer blend is oriented in the melted state at a temperature of at least 150° C. to form the article.

\* \* \* \* \*